United States Patent [19]

Yamagishi

[11] Patent Number: 6,133,379
[45] Date of Patent: Oct. 17, 2000

[54] METHOD FOR PRODUCING A RESIN COMPOSITION

[75] Inventor: Miki Yamagishi, Sodegaura, Japan

[73] Assignee: Asahi Kasei Kogyo Kabushiki Kaisha, Osaka, Japan

[21] Appl. No.: 09/021,390

[22] Filed: Feb. 10, 1998

[30] Foreign Application Priority Data

Feb. 18, 1997 [JP] Japan ..................... 9-048554

[51] Int. Cl.$^7$ .............. C08L 25/02; C08L 8/00; C08F 8/30; C08F 283/08
[52] U.S. Cl. ............ 525/241; 525/183; 525/198; 525/391
[58] Field of Search ............... 525/241, 183, 525/391, 198

[56] References Cited

U.S. PATENT DOCUMENTS

| | | | |
|---|---|---|---|
| 3,383,435 | 5/1968 | Cizek et al. | 260/874 |
| 4,880,877 | 11/1989 | Sugimori et al. | 525/84 |
| 4,921,909 | 5/1990 | Sugimori et al. | 525/64 |
| 4,992,510 | 2/1991 | Sugimori et al. | 525/84 |
| 5,109,068 | 4/1992 | Yamasaki et al. | 525/151 |
| 5,196,479 | 3/1993 | Laughner et al. | 525/67 |
| 5,447,989 | 9/1995 | Mylonakis et al. | 525/67 |
| 5,475,053 | 12/1995 | Niessner et al. | 525/64 |
| 5,635,570 | 6/1997 | Abe et al. | 525/391 |
| 5,811,492 | 9/1998 | Mori et al. | 525/537 |

FOREIGN PATENT DOCUMENTS

| | | |
|---|---|---|
| 0643089A1 | 3/1995 | European Pat. Off. . |
| 4117444 | 4/1992 | Japan . |

OTHER PUBLICATIONS

"handbook of Thermoplastics", by Olabasi, Marcel Dekker, Inc, 1997, pp. 588–591, 1023.

*Primary Examiner*—David W. Wu
*Assistant Examiner*—Tanya Zalukaeva
*Attorney, Agent, or Firm*—Birch, Stewardt, Kolasch & Birch, LLP

[57] ABSTRACT

The present invention relates to a method for producing a thermoplastic resin composition by melt mixing Thermoplastic Resin (A) with Thermoplastic Resins (B) and (C) having a lower melting temperature or glass transition point than Thermoplastic Resin (A) by 10° C. or more. The method comprises feeding Thermoplastic Resin (A) containing volatile components having a molecular weight of 300 or less at an amount of 500 to 30,000 ppm and Thermoplastic Resin (B) containing fewer volatile components than Component A from a top supply port of a melt kneader, removing volatile components under reduced pressure, and feeding Thermoplastic Resin (C) from a side supply port. According to the present invention, it is possible to produce a thermoplastic resin composition which satisfies inconsistent properties, i.e., improved impact strength and fewer volatile components, while at the same time having advantages in energy consumption and operation.

12 Claims, 1 Drawing Sheet

METHOD FOR PRODUCING A RESIN COMPOSITION

BACKGROUND OF THE INVENTION

1. Field of the Invention

The present invention relates to a method for producing a thermoplastic resin composition. Particularly, it concerns a method for producing, with industrial advantages, a thermoplastic resin composition having excellent impact resistance and fewer volatile components by mixing thermoplastic resins whose melting temperatures or glass transition points differ by 10° C. or more with respect to each other.

2. Description of the Related Art

Thermoplastic Resin (A) having poor flowability and impact strength in spite of good heat resistance has been used by mixing it with a thermoplastic resin and/or an elastomer and the like which has a lower melting temperature or glass transition point than Thermoplastic Resin (A) by 10° C. or more. Conventional methods for mixing such resins and/or an elastomer and the like having a melting temperature or glass transition point which is at least 10° C. lower than that of Thermoplastic Resin (A) are exemplified as follows:

(1) a method comprising mixing a powder or pellets of both resins in the form of a solid using a tumbler, melt mixing the resultant mixture with a kneader such as a single-stage melt extruder to pelletize it, and injection or extrusion molding the obtained pellets to produce a molded article;

(2) a method comprising mixing a powder or pellets of both resins in the form of a solid using a tumbler and subsequently injection or extrusion molding the resultant mixture to produce a molded article; and (3) a method comprising mixing Thermoplastic Resin (A) with a small amount of Thermoplastic Resin (B), which has a melting temperature or glass transition point which is at least 10° C. lower than that of Thermoplastic Resin (A), in the form of a solid, pelletizing the resultant mixture with a kneader such as a melt extruder, further mixing the resultant pellets with Thermoplastic Resin (C) and the like, which also has a melting temperature or glass transition point which is at least 10° C. lower than that of Thermoplastic Resin (A), in the form of a solid, and pelletizing the mixture with a kneader such as a second melt extruder (Japanese Patent Application Laid-Open No. 117444/1992).

However, according to Method (1), at the step of kneading with a melt extruder, which is carried out for mixing the resin uniformly, the resin temperature disadvantageously increases in order to melt Component A so that Component B and the like deteriorate. Accordingly, the impact strength and like properties of the resultant resin composition become poor. If the resin temperature is lowered to avoid the deterioration of impact strength and the like, the resins cannot be well kneaded and also the amount of the volatile component cannot be reduced. If the amount of the elastomer to be added is increased, the amount of the volatile component cannot be reduced though the impact resistance is improved.

According to Method (2), silver streaks and the like appear on the resultant molded article because Component A is not deaerated (i.e., volatile components of Component A are not removed). When Component A is not deaerated (i.e., volatile components of Component A are not removed), Thermoplastic Resin (A) is not melt mixed sufficiently since Thermoplastic Resin (B) melts prior to the melting of Thermoplastic Resin (A) and particles of non-melted Thermoplastic Resin (A) are produced. Further, a sufficient impact strength cannot be achieved.

In the above Method (3) (a master batch method), the melt mixing is carried out in two steps. Therefore, the resin is deteriorated so that the impact strength is reduced. In addition, this method has drawbacks such as disadvantageous energy consumption and a complicated operation.

Japanese Patent Application Laid-Open No. 149917/1995 discloses a method for producing a thermoplastic resin composition wherein, when 100 parts by weight of a composition comprising a polyphenylene ether and an aromatic alkenyl compound polymer is melt mixed in the presence of one or more parts by weight of an organic solvent using an extruder, polyphenylene ether, a part of an aromatic alkenyl compound polymer and an organic solvent are fed from a raw material supply port located at the upper point of the resin stream and the residual part of the aromatic alkenyl compound polymer is fed from a raw material supply port located at the lower point of the resin stream. According to this method, the organic solvent is kneaded with a mixture of polyphenylene ether and the aromatic alkenyl compound polymer in an extruder so that the components are not sufficiently mixed. When the amount of the organic solvent is increased for the purpose of sufficient mixing, removal of the organic solvent becomes difficult and further the extrusion productivity falls and the extrusion amount of the resin changes due to back flow of the gas towards the first raw material supply port.

SUMMARY OF THE INVENTION

The present invention aims at advantageously producing a thermoplastic resin composition which satisfies inconsistent properties, i.e., improved impact resistance and fewer volatile components, while at the same time with less industrial energy consumption.

BRIEF DESCRIPTION OF THE DRAWINGS

The attached FIGURE illustrates the present invention.

DESCRIPTION OF NUMERALS AND SYMBOLS

Figure 1:
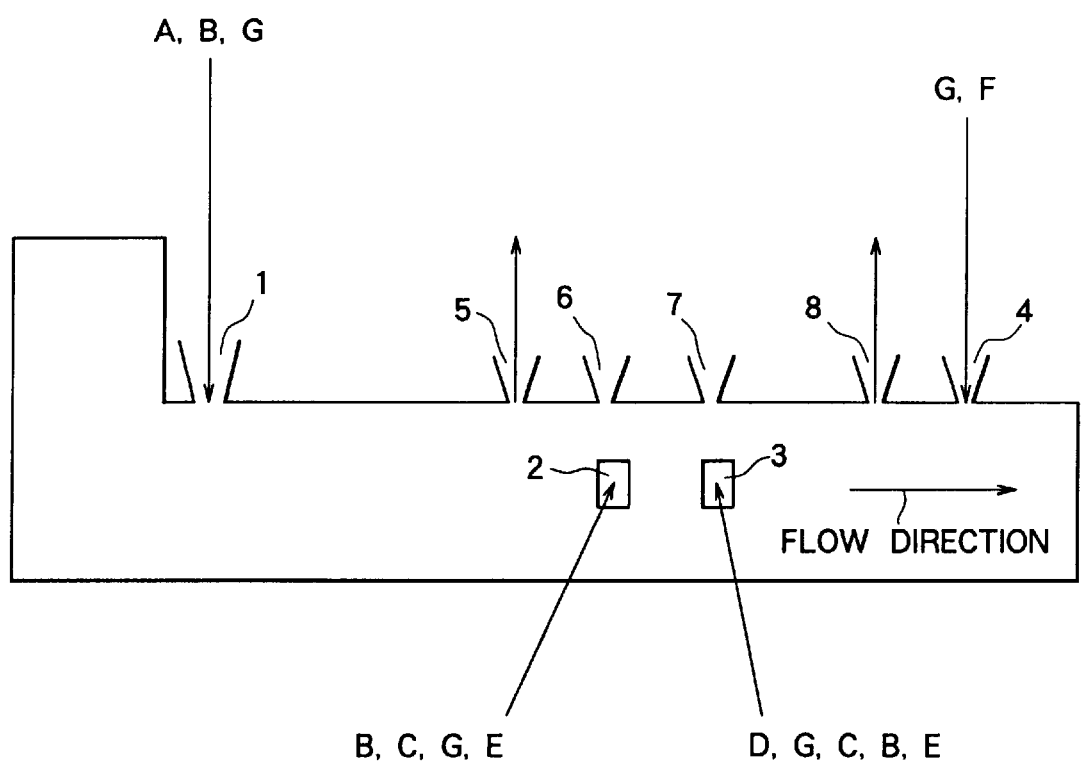

1: a first raw material supply port (a top feeding port)
2: a second raw material supply port (a first side feeding port)
3: a third raw material supply port (a second side feeding port)
4: a fourth raw material supply port
5: a first opening for removing volatile components under reduced pressure
6: an atmosphere vent port
7: an atmosphere vent port
8: a second opening for removing volatile components under reduced pressure
A: a polyphenylene ether resin
B: a general-purpose polystyrene
C: a styrene resin reinforced by an elastomer
D: a filler
E: an elastomer
F: a volatile flame retardant
G: a nonvolatile flame retardant

DETAILED DESCRIPTION OF THE INVENTION

The present invention relates to a method for producing a thermoplastic resin composition by melt mixing Thermoplastic Resin (A) with Thermoplastic Resins (B) and (C) having a melting temperature or glass transition point which is lower than that of Thermoplastic Resin (A) by 10° C. or more comprising feeding Thermoplastic Resin (A) (hereinafter sometimes referred to as Component A) containing volatile components having a molecular weight of 300 or less at an amount of 500 to 30,000 ppm and Thermoplastic Resin (B) (hereinafter sometimes referred to as Component B) containing fewer volatile components than Component A from a first supply port of the melt kneader, removing volatile components under reduced pressure, and feeding Thermoplastic Resin (C) (hereinafter sometimes referred to as Component C) from a second supply port.

The combinations of Thermoplastic Resins (A), (B) and (C) include:

- a combination of a polyphenylene ether resin for Thermoplastic Resin (A) and a styrene resin for Thermoplastic Resins (B) and (C);
- a combination of a polyphenylene sulfide resin for Thermoplastic Resin (A) and a modified polyphenylene ether resin and/or a styrene type resin for Thermoplastic Resins (B) and (C);
- a combination of a polycarbonate resin for Thermoplastic Resin (A) and an ABS resin and/or a styrene resin for Thermoplastic Resins (B) and (C);
- a combination of a polyphenylene ether resin for Thermoplastic Resin (A), general-purpose polystyrene for Thermoplastic Resin (B), and a styrene resin reinforced by an elastomer for Thermoplastic Resin (C); and the like.

The polyphenylene ether resins employed in the present invention are homopolymers or copolymers having repeating units represented by the following formulas (1) and/or (2):

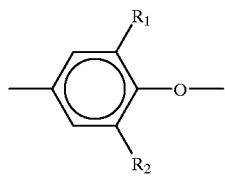

(1)

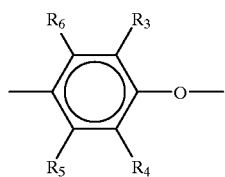

(2)

wherein $R_1$, $R_2$, $R_3$, $R_4$, $R_5$ and $R_6$ each independently represents an alkyl group having 1 to 4 carbon atoms, an aryl group, halogen and hydrogen; and wherein $R_5$ and $R_6$ cannot be hydrogen at the same time. These resins may be used in combination.

Representative examples of the homopolymer of the polyphenylene ether resin include poly(2,6-dimethyl-1,4-phenylene)ether, poly(2-methyl-6-ethyl-1,4-phenylene) ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene) ether, poly(2-ethyl-6-isopropyl-1,4-phenylene)ether, poly(2-methyl-6-hydroxyethyl-1,4-phenylene) ether, poly(2-methyl-6-chloroethyl-1,4-phenylene)ether and the like. Of these, poly(2,6-dimethyl-1,4-phenylene)ether is particularly preferred.

The polyphenylene ether copolymer is a copolymer having, for instance, a phenylene ether structure as a main monomer unit. For example, there are exemplified a copolymer of 2,6-dimethylphenol and 2,3,6-trimethylphenol, a copolymer of 2,6-dimethylphenol and o-cresol, a copolymer of 2,6-dimethylphenol, 2,3,6-trimethylphenol and o-cresol, or the like.

The polyphenylene ether resins used in the present invention may advantageously contain, as a partial structure, various other phenylene ether units which are proposed to exist in the conventional polyphenylene ether resins. The phenylene ether units which are proposed to coexist in a small amount include a 2-(dialkylaminomethyl)-6-methylphenylene ether unit, a 2-(N-alkyl-N-phenylaminomethyl)-6-methylphenylene ether unit and the like, which are disclosed in Japanese Patent Application Laid-Open Nos. 297428/1989 and 301222/1988.

Further, the polyphenylene ether resins employed in the present invention include a resin in which a small amount of diphenoquinone and the like is linked in the main chain.

Moreover, the polyphenylene ether resin include, for instance, polyphenylene ether modified by a compound with carbon-carbon double bonds as disclosed in Japanese Patent Application Nos. 276823/1990, 108095/1988 and 59724/1984.

The polyphenylene ether resin used in the present invention can be produced by, for instance, subjecting 2,6-xylenol to oxidization coupling polymerization in the presence of dibutylamine according to the method disclosed in Japanese Patent Publication No. 13966/1993. The molecular weight and the molecular weight distribution are not particularly restricted.

The polyphenylene sulfide resin employed in the present invention, which is generally referred to as PPS, is a homopolymer containing repeating units represented by the following general formula (3):

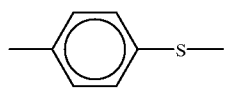

(3)

The polycarbonate resin empoyed in the present invention is a polymer containing repeating units represented by the following general formula (4):

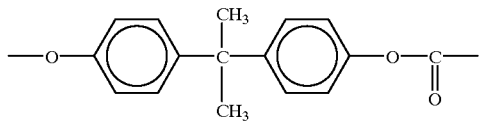

(4)

The styrene resin employed in the present invention includes general-purpose polystyrene and styrene resins reinforced by an elastomer.

General-purpose polystyrene includes, in addition to a styrene polymer, a polymer of a nuclear alkyl substituted styrene like o-methylstyrene, p-methylstyrene, m-methylstyrene, 2,4-dimethylstyrene, ethylstyrene and p-tert-butylstyrene and an α-alkyl substituted styrene like α-methylstyrene and α-methyl-p-ethylstyrene; a copolymer comprising one or more of the above vinyl aromatic compounds and at least one other vinyl compound; and a copolymer comprising two or more of the above compounds. Compounds copolymerizable with the vinyl aromatic compounds include methacrylate esters such as methyl methacrylate and ethyl methacrylate, unsaturated nitrile compounds such as acrylonitrile and methacrylonitrile, acid anhydrides such as maleic anhydride, and the like. The polymerization method for preparing these resins includes not only radial polymerization but also ion polymerization. Polymers particularly preferred among the above polymers are polystyrene and a styrene-acrylonitrile copolymer (an AS resin). These resins may be used in combination.

Elastomers which are used to reinforce styrene resins include polybutadiene, a styrene-butadiene copolymer, polyisoprene, a butadiene-isoprene copolymer, natural rubbers, an ethylene-propylene copolymer and the like. Particularly, polybutadiene, a styrene-butadiene copolymer and a partially hydrogenated polymer thereof are preferred.

As the styrene resin reinforced by an elastomer, elastomer-reinforced polystyrene (HIPS) and an elastomer-reinforced styrene-acrylonitrile copolymer (an ABS resin) are preferred. A mixture of these resins is also preferred. The content of the elastomer is 6% or more, preferably 8% or more, more preferably 10% or more.

The composition comprises preferably 5 to 92.5% by weight of Component A, 5 to 80% by weight of Component B and 2.5 to 80% by weight of Component C, more preferably 10 to 90% by weight of Component A, 5 to 70% by weight of Component B and 2.5 to 60% by weight of Component C.

The reason why Component B is fed from the top feeding port together with Component A is to facilitate the melt mixing of Component A, to effectively increase the amount of the resin to be extruded, and to facilitate the melt mixing of Component C. The amount of Component B is preferably 5 to 100% by weight, more preferably 10 to 50% by weight, most preferably 20 to 30% by weight, based on the amount of Component A. Too large of an amount of Component B increases the volatile components of the thermoplastic resin composition and advances heat deterioration of Component B. In addition, only Component B is easy to melt so that it is difficult to melt Component A uniformly. Too small of an amount of Component B deteriorates the melt mixing of Component A so that the amount of resin to be extruded must be reduced and, as a result, the extrusion becomes unstable. Moreover, the mixture of Components A and B is not sufficiently melt mixed with Component C so that the extrusion becomes unstable.

The amount of Component C is preferably 50 to 500% by weight, more preferably 75 to 300% by weight, most preferably 100 to 200% by weight, based on the amount of Component B. Too small of an amount of Component C suggests that the amount of Component B is relatively large. This results in the heat deterioration of Component B. Too large of an amount of Component C unpreferably causes a sudden decrease in the temperature of the resin composition, thereby making the extrusion unstable.

In order to enhance the flowability of Thermoplastic Resin (A), the melting temperature or glass transition point of Thermoplastic Resins (B) and (C) must be lower than that of Thermoplastic Resin (A) by 10° C. or more, preferably 30° C. or more.

The volatile component with a molecular weight of 300 or less contained in Component A is effective in decreasing the melting temperature of Thermoplastic Resin (A) having a high melting temperature (softening temperature), and in facilitating mixing of Component A with Component B having a lower melting temperature than Component A. However, when the amount of the volatile component is too large, the volatile component is not removed sufficiently in a melt kneader so that silver streaks and the like appear after molding and sufficient impact strength cannot be achieved. Accordingly, it is necessary that the amount of the volatile component with a molecular weight of 300 or less contained in Component A is 500 to 30,000 ppm. When the polymerization solvent used to obtain Thermoplastic Resin (A), a monomer oligomer and the like which remain after washing, filtration and drying of the resultant Thermoplastic Resin (A) are employed as the volatile components, it is possible to skip a step of adding and impregnating the volatile component with a molecular weight of 300 or less in Component A.

The volatile component with a molecular weight of 300 or less contained in Component B considerably decreases the melting temperature of Component B when its amount exceeds that of the volatile component with a molecular weight of 300 or less contained in Component A. As a result, it becomes difficult to melt mix Component B with Component A. Accordingly, the amount of the volatile component with a molecular weight of 300 or less contained in Component B should be smaller than that of the volatile component contained in Component A.

The volatile components with a molecular weight of 300 or less include aromatic hydrocarbons having 6 to 18 carbon atoms such as ethylbenzene, xylene, toluene and styrene, alcohols having 1 to 10 carbon atoms, and the like.

Hereinafter, methods for producing the resin composition of the present invention are illustrated with reference to the drawing.

Specifically, one embodiment of the invention relates to a method for producing a polyphenylene ether resin composition using a melt kneader such as an extruder equipped with a first raw material supply port 1, which is arranged at the upper point of the stream of raw material, and a second raw material supply port 2. This method comprises feeding a polyphenylene ether resin A and a general-purpose polystyrene B after dry blending them and/or feeding them individually from the first supply port 1; removing, at the opening 5, volatile components from the composition containing a large amount of volatile components and polyphenylene ether at a high concentration; and feeding an elastomer reinforced styrene resin C from the second supply port 2.

Another embodiment of the invention relates to a method for producing a polyphenylene ether resin composition using a melt kneader equipped with a first raw material supply port 1, which is arranged at the upper point of the stream of raw material, a second raw material supply port 2, a third raw material supply port 3 and a fourth raw material supply port 4. This method comprises feeding a polyphenylene ether resin A and a general-purpose polystyrene B after dry blending them and/or feeding them individually from the first supply port 1; removing, at the opening 5, volatile components from the composition containing a high concentration of polyphenylene ether and a large amount of volatile components; feeding a general-purpose polystyrene B, an elastomer reinforced styrene resin C, an elastomer E and a nonvolatile flame retardant G from the second supply port 2; feeding a general-purpose polystyrene B, an elastomer reinforced styrene resin C, a filler D, an elastomer E and a nonvolatile flame retardant G from the third supply port 3; removing volatile components at the opening 8; and feeding a volatile flame retardant F in the form of a liquid from the fourth supply port. The screw systems arranged halfway between the raw material supply ports are capable of transmitting and melt mixing the resin. A screw system is provided at each supply port in order to relieve pressure from the resin. Around the second and third supply ports 2 and 3, atmosphere vent ports 6 and 7 are preferably arranged. If there is nothing to feed from the third supply port, it is not used and sometimes is sealed.

By feeding an elastomer reinforced styrene resin from a side supply port, the time, during which the elastomer is heated, is shortened in order to prevent the resin from deteriorating. As a result, a polyphenylene ether resin composition having high impact resistance and fewer volatile components can be obtained. Although it is preferable that all the elastomer reinforced styrene resin is fed from a side supply port, a part of the resin can be fed from the top supply port in the case that a styrene resin component is not employed since the initial melt mixing of Component A with the screw of the kneader cannot be sufficiently carried out when only Component A is fed from the top supply port 1.

According to the conventional single-step extrusion method, the impact strength is improved by adding an elastomer, but it is difficult to produce a composition having fewer volatile components. According to the two-step extrusion method, the impact strength is improved by increasing the amount of elastomer to be added, but the thermal stability is lowered by deterioration of the elastomer, the operational ability is disadvantageously affected and the energy consumption becomes large.

When a volatile flame retardant is added as an additive, the volatiles loss can be reduced by adding it after the removal of volatile components under a reduced pressure. In the case of a nonvolatile flame retardant, it can be added at any stage and also can be added in stages.

The melt kneaders which can be employed include a single-screw extruder, a twin-screw extruder, a multi-screw extruder and the like. The preferable twin-screw extruders are ZSK series manufactured by Werner & Pfleiderer GmbH, TEM series manufactured by Toshiba Machine Co., Ltd., TEX series manufactured by the Japan Steel Works, Ltd. and the like. The ratio of the length to the screw diameter (L/D) of the melt kneader is in the range of 10 to 80. When the L/D is less than 10, it becomes difficult to remove volatile components and to side feed. When the L/D is more than 80, the residence time of the resin becomes too long and the resin is likely to be deteriorated.

The pressure used to remove volatile components is under atmospheric pressure, preferably 250 Torr or less, more preferably 150 Torr or less, further preferably 50 Torr or less, at each opening for removing volatile components of the melt kneader.

The melt mixing temperature is preferably set so as to decrease from the top feeding port towards the exit of the kneader. The barrel temperatures are set at 280° to 360° C., preferably 320° to 340° C., between the top feeding port and the first side feeding port, and at 200° to 320° C., preferably 240° to 300° C., between the first side feeding port and the exit. A uniform composition can be obtained by melt mixing the components at a shear rate of 10 sec$^{-1}$ to 250 sec$^{-1}$ in each zone.

The fillers, Component D, include an inorganic powder, an inorganic filler, an organic filler, a colorant, silicone and the like. Specifically, they include one or more components selected from the group consisting of diatomaceous earth, carbon, talc, mica, glass beads, glass flakes, glass fiber, carbon fiber, Kepler's fiber, stainless steel fiber, copper fiber and the like. Further, there is preferably employed a master batch method wherein these components are compounded with a resin and the like to improve handling and dispersion properties.

The elastomers, Component E, include polybutadiene, a styrene-butadiene copolymer, polyisoprene, a butadiene-isoprene copolymer, natural rubber, an ethylene-propylene copolymer and the like. Particularly, polybutadiene and a styrene-butadiene copolymer are preferred. These elastomers may be used in combination.

The volatile flame retardant, Component F, is preferably a phosphate type flame retardant. For example, phosphate type flame retardants having a boiling point of 400° C. or lower such as triphenyl phosphate and cresyl diphenyl phosphate may be employed.

The nonvolatile flame retardant, Component G, preferably has a boiling point of higher than 400° C. and therefore is unlikely to volatilize during the removal of volatile components under reduced pressure and at the end of a nozzle. Specifically, it includes one or more compounds selected from the group consisting of a phosphate ester compound having a linking structure comprising a bifunctional phenol and specific monofunctional phenol at the terminal end, antimony trioxide, a halogen type flame retardant and the like. More specifically, the phosphate ester compounds include one or more compounds selected from aromatic condensation phosphate esters such as 2,2-bis-{4-(bis (methylphenoxy)phosphonyloxy)-phenyl}propane (hereinafter referred to as CR741), 2,2-bis-{4-(bis (phenoxy)-phosphonyloxy)phenyl}propane, reosorcinol bis (diphenylphosphate) and the like.

Components F and G in the form of a powder can be melted before they are added to the resin components. Such a method for adding the flame retardants to the resin composition is disclosed, for instance, in Japanese Patent Application Laid-Open No. 237812/1996 and PCT/JP97/03179.

The amounts of the components other than the thermoplastic resin contained in the composition are preferably 0 to 50% by weight for Component D, 0 to 30% by weight for Component E, 0 to 30% by weight for Component F and 0 to 30% by weight for Component G; more preferably 0 to 42% by weight for Component D, 0 to 10% by weight for Component E, 0 to 10% by weight for Component F and 0 to 10% by weight for Component G.

BEST MODE FOR CARRYING OUT THE INVENTION

Hereinafter, the present invention is described in more detail with reference to Examples.

In the Examples and Comparative Examples, a powder of poly-2,6-dimethyl-1,4-phenylene ether (hereinafter referred to as PPE) having an intrinsic viscosity [η] of 0.53, which was measured at 30° C. in chloroform, was employed as the polyphenylene ether resin of Component A. The amount of the volatile component with a molecular weight of 300 or less contained in the PPE was 12,000 ppm unless otherwise mentioned.

As the general-purpose polystyrene of Component B, there was employed polystyrene (hereinafter referred to as GP) having a weight-average molecular weight of 260,000, a number-average molecular weight of 140,000 and a volatile component with a molecular weight of 300 or less in an amount of 500 ppm. As the elastomer reinforced styrene resin of Component C, there was employed high impact polystyrene (hereinafter referred to as HIPS) having a polybutadiene concentration of 12%, polybutadiene particle diameter of 1.5μm and a volatile component in an amount of 1,000 ppm.

As the filler of Component D, there was employed a glass fiber (hereinafter referred to as GF) having a diameter of 13 μm and a cut length of 3 mm. As the elastomer of Component E, a styrene-butadiene copolymer was employed. As the volatile flame retardant of Component F, triphenyl phosphate (hereinafter referred to as TPP) was employed. As the nonvolatile flame retardant of Component G, 2,2-bis-{4-(bis (methylphenoxy)phosphoryloxy) phenyl}propane (hereinafter referred to as CR741C) was employed.

In the Examples and Comparative Examples, the evaluation of the resin composition and molded article and the measurement of specific energy at the extrusion were carried out according to the following manners.

(1) Melt viscosity (MFR): ASTM D 1238
(2) Izod impact strength: ASTM D 256
(3) Flexural strength: ASTM D 790
(4) Volatile component:
  The volatile components with a low molecular weight such as ethylbenzene, xylene, toluene and styrene were determined at 115° C. using a column filler, PEG-20M 25% (Carrier of Chromosorve W, column length of 3 meters) using gas chromatography. The volatile components with a high molecular weight such as a styrene dimer were determined at 190° and 260° C. using a column filler, Silicon OV-17 3% (Carrier of Chromosorve W, column length of 3 meters). The volatile components contained in the resin composition were determined and defined by summing up the amounts of the components which have a shorter retention time than a styrene trimer.
(5) Residual rate of volatile component (wt. %):
  (volatile components contained in an extruded resin composition/volatile components contained in a raw material fed in an extruder)×100
(6) Glass transition point (Tg):
  The temperature where loss elastic modulus reached a peak, which was measured according to the Vibron method (ORIENTEC Co., Rheo Vibron DDV-25FP), was defined as a glass transition point.
(7) Specific energy (KWH/KG):
  Electric power on the output side of a motor/fed amount of a composition
(8) Evaluation of appearance of a molded article containing non-melted PPE:
  A film having a thickness of 0.04 to 0.06 mm and a size of 50 mm×90 mm was
  prepared. One non-melted PPE having a diameter of 0.2 mm or less scored one.
  One non-melted PPE having a diameter of 0.2 to 0.5 mm scored ten. A film scoring
  25 or less was defined as good (○).

EXAMPLE 1

As a melt kneader, a twin-screw extruder (L/D=44), whose screws rotated in the same direction, was employed. From the top feeding port 1, 54.7 parts of PPE, 12.8 parts of GP and 0.3 part of antioxidant were fed in the melt kneader and melt mixed. Volatile components were removed from the mixed composition under reduced pressure of 50 Torr at the opening 5. From the side feeding port 2, 28 parts of HIPS was fed and melt mixed. Then, volatile components were removed under 50 Torr at the opening 8, and 4.2 parts of TPP was further fed therein. The ports 3 and 7 were sealed and not used. The physical properties of the resultant resin composition were measured. The results are shown in the Table.

Comparative Example 1

As a melt kneader for the first stage, a twin-screw extruder (L/D=32), whose screws rotated in the same direction, was employed. From the top feeding port, 54.7 parts of PPE, 12.8 parts of GP, 0.3 part of antioxidant and 28 parts of HIPS were fed in the melt kneader and melt mixed. Volatile components were removed under reduced pressure of 50 Torr at the opening 5, and 4.2 parts of TPP was further fed therein. The volatile component of the resultant composition was 3,200 ppm. As a melt kneader for the second stage, a 90 mmø single-screw extruder was employed. All the amount of the resin composition produced at the first stage was fed from the top feeding port and melt mixed. Then, volatile components were removed under 50 Torr. The physical properties of the resultant resin composition were measured. The results are shown in the Table.

Comparative Example 2

As a melt kneader for the first stage, a twin-screw extruder (L/D=32), whose screws rotated in the same direction, was employed. From the top feeding port, 54.7 parts of PPE, 12.8 parts of GP, 0.3 part of antioxidant, 25 parts of HIPS and 3 parts of an elastomer were fed in the melt kneader and melt mixed. Volatile components were removed under reduced pressure of 50 Torr, and 4.5 parts of TPP was further fed therein. The volatile component of the resultant composition was 3,200 ppm. As a melt kneader for the second stage, a 90 mmø single-screw extruder was employed. All the amount of the resin composition produced at the first stage was fed from the top feeding port and melt mixed. Then, volatile components were removed under 50 Torr. The physical properties of the resultant resin composition were measured. The results are shown in the Table.

EXAMPLE 2

As a melt kneader, a twin-screw extruder (L/D=44), whose screws rotated in the same direction, was employed. From the top feeding port 1, 54.7 parts of PPE containing the volatile components with a molecular weight of 300 or less at an amount of 30,000 ppm, 12.8 parts of GP and 0.3 part of antioxidant were fed in the melt kneader and melt mixed. Volatile components were removed under reduced pressure of 50 Torr at the opening 5. From the side feeding port 2, 28 parts of HIPS and 20 parts of GP were fed and melt mixed. Then, volatile components were removed under 50 Torr at the opening 8, and 4.2 parts of TPP was further fed therein. The ports 3 and 7 were sealed and not used. The physical properties of the resultant composition were measured. The results are shown in the Table.

Comparative Example 3

As a melt kneader for the first stage, a twin-screw extruder (L/D=44), whose screws rotated in the same direction, was employed. From the top feeding port 1, a mixture prepared by well mixing 54.7 parts of PPE containing the volatile components with a molecular weight of 300 or less at an amount of less than 500 ppm, 12.8 parts of GP, 0.3 part of antioxidant and 1.6 parts of xylene was fed in the melt kneader and melt mixed. Volatile components were removed under reduced pressure of 50 Torr at the opening 5. From the side feeding port 2, 28 parts of HIPS was fed and melt mixed. Then, volatile components were removed under 50 Torr, and 4.2 parts of TPP was further fed therein. The ports 3 and 7 were sealed and not used. The physical properties of the resultant resin composition were measured. The results are shown in the Table.

EXAMPLE 3

As a melt kneader, a twin-screw extruder (L/D=44), whose screws rotated in the same direction, was employed.

From the top feeding port 1, 48.1 parts of PPE, 19 parts of GP and 0.3 part of antioxidant were fed in the melt kneader and melt mixed. Volatile components were removed under reduced pressure of 50 Torr at the opening 5. After 28 parts of HIPS and 20 parts of GP were fed from the first side feeding port 2 and melt mixed, 20 parts of GF was fed from the second side feeding port 3. Volatile components were removed under 50 Torr at the opening 8, and 4.6 parts of TPP was fed from the fourth raw material supply port 4. The physical properties of the resultant resin composition were measured. The results are shown in the Table.

Comparative Example 4

As a melt kneader for the first stage, a twin-screw extruder (L/D=32), whose screws rotated in the same direction, was employed. From the top feeding port, 48.1 parts of PPE, 19 parts of GP, 0.3 part of antioxidant and 8 parts of HIPS were fed in the melt kneader and melt mixed. Volatile components were removed under reduced pressure of 50 Torr, and 4.6 parts of TPP was further fed therein. As a melt kneader for the second stage, a 90 mmø single-screw extruder was employed. From the top feeding port, 80 parts of the resin composition produced at the first stage and 20 parts of GP were fed and melt mixed. From the side feeding port, 20 parts of GF was fed and melt mixed. Then, volatile components were removed under 50 Torr. The physical properties of the resultant resin composition were measured. The results are shown in the Table.

EXAMPLE 4

As a melt kneader, a twin-screw extruder (L/D=44), whose screws rotated in the same direction, was employed. From the top feeding port 1, 54.7 parts of PPE, 12.8 parts of GP and 0.3 part of antioxidant were fed in the melt kneader and melt mixed. Volatile components were removed under reduced pressure of 50 Torr at the opening 5. From the first and second side feeding ports 2 and 3, 28 parts of HIPS and 4.2 parts of CR741C were fed, respectively. After melt mixing, volatile components were removed under 50 Torr at the opening 8. The port 7 was sealed. The physical properties of the resultant resin composition were measured. The results are shown in the Table.

The present invention has succeeded in industrially producing a thermoplastic resin composition which satisfies inconsistent properties, i.e., improved impact strength and fewer volatile components, while at the same time having advantages in energy consumption and operation.

TABLE

|  | Ex. 1 | Comp. Ex. 1 | Comp. Ex. 2 | Ex. 2 | Comp. Ex. 3 | Ex. 3 | Comp. Ex. 4 | Ex. 4 |
|---|---|---|---|---|---|---|---|---|
| PPE (part) | 54.7 | 54.7 | 54.7 | 54.7 | 54.7 | 48.1 | 48.1 | 54.7 |
| GP (part) | 12.8 | 12.8 | 12.8 | 12.8 | 12.8 | 39 | 39 | 12.8 |
| HIPS (part) | 28 | 28 | 25 | 28 | 28 | 8 | 8 | 28 |
| Elastomer (part) | — | — | 3 | — | — | — | — | — |
| GF (part) | — | — | — | — | — | 20 | 20 | — |
| TPP (part) | 4.2 | 4.2 | 4.2 | 4.2 | 4.2 | 4.6 | 4.6 | — |
| CR741C (part) | — | — | — | — | — | — | — | 4.2 |
| Antioxidant (part) | 0.3 | 0.3 | 0.3 | 0.3 | 0.3 | 0.3 | 0.3 | 0.3 |
| Number of Extrusion | 1 | 2 | 2 | 1 | 1 | 1 | 2 | 1 |
| MFR (g/10 min.) 250° C., 10 kg | 4.2 | 3.9 | 3.9 | 4.3 | 4.3 | 2.8 | 2.8 | 4.2 |
| Izod Impact Strength (kg · cm/cm) | 11.4 | 10.3 | 11.5 | 11.4 | 11.3 | 6.2 | 4.3 | 11.4 |
| Flexural Strength (kg/cm$^2$) | — | — | — | — | — | 1,500 | 1,300 | — |
| Volatile Component (ppm) | 1,300 | 1,400 | 1,400 | 3,300 | 3,300 | 500 | 400 | 1,300 |
| Residual Rate Thereof (%) | 19 | 20 | 20 | 19 | 20 | 10 | 8 | 19 |
| Tg of Elastomer Component (° C.) | −75 (Sharp) | −63 (Broad) | −63 (Broad) | −75 (Sharp) | — | — | — | −75 (Sharp) |
| Specific Energy (KWH/KG) | 0.17 | 0.3 | 0.3 | 0.17 | 0.17 | 0.18 | 0.36 | 0.17 |
| Appearance of Molded Article Containing Non-melted PPE | ○ | ○ | ○ | ○ | x | — | — | ○ |

What is claimed is:

1. A method for producing a thermoplastic resin composition by melt mixing a polyphenylene ether resin (Component A) with a general purpose polystyrene (Component B) and a styrene resin reinforced by an elastomer (Component C) having a glass transition point which is lower than that of Component A by 10° C. or more which comprises feeding Component A containing volatile components having a molecular weight of 300 or less in an amount of 500 to 30,000 ppm and Component B containing a smaller amount of volatile components than the amount of volatile components of Component A from a first supply port of a melt kneader, removing volatile components therefrom under reduced pressure, and feeding Thermoplastic Resin (C) from a second supply port, and removing volatile components at a system for removing volatile comonents under reduced pressure applied at a point where the resin composition passes after the second supply port, wherein the ratio of the amount of Component B to that of Component A, both of which are fed from the first supply port, is about 0.05 to 1 and the ratio of the amount of Component C fed from the second supply port to that of component B is about 0.5 to 5.

2. The method for producing a thermoplastic resin composition according to claim 1, wherein a barrel temperature between the first supply port and the second supply port is set in the range of 320° to 360° C. and a temperature between the second supply port and the exit is set in the range of 240° to 320° C.

3. The method for producing a thermoplastic resin composition according to 1 or 2, wherein a volatile flame retardant is fed after the resin composition passes the system for removing volatile components under reduced pressure applied at a point where the resin composition passes after the second supply port.

4. The method for producing a thermoplastic resin composition according to claim 1, wherein the system for removing volatile components under reduced pressure comprises an opening.

5. The method for producing a thermoplastic resin composition according to claim 1, wherein the reduced pressure is about 250 Torr or less.

6. The method for producing a thermoplastic resin composition according to claim 1, wherein the polyphenylene ether resin is selected from the group consisting of poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-hydroxyethyl-1,4-phenylene)ether, poly(2-methyl-6-chloroethyl-1,4-phenylene)ether, a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol and o-cresol.

7. The method for producing a thermoplastic resin composition according to claim 1, wherein the thermoplastic resin composition further comprises at least one filler selected from the group consisting of diatomaceous earth, carbon, talc, mica, glass beads, glass flakes, glass fiber, carbon fiber, Kepler's fiber, stainless steel fiber, and copper fiber.

8. The method for producing a thermoplastic resin composition according to claim 1, wherein the thermoplastic resin composition further comprises at least one elastomer selected from the group consisting of polybutadiene, styrene-butadiene copolymer, polyisoprene, butadiene-isoprene copolymer, natural rubber, and ethylene-proplylene copolymer.

9. The method for producing a thermoplastic resin composition according to claim 1, wherein the thermoplastic resin composition further comprises at least one volatile flame retardant selected from the group consisting of triphenyl phosphate and cresyl diphenyl phosphate.

10. The method for producing a thermoplastic resin composition according to claim 1, wherein the thermoplastic resin composition further comprises at least one nonvolatile flame retardant selected from the group consisting of 2,2-bis{4-(bis(methylphenoxy)phosphonyloxy)-phenyl}propane, 2,2-bis{4-(bis(phenoxy)phosphonyloxy)-phenyl}propane, and resorcinol bis(diphenylphosphate).

11. The method for producing a thermoplastic resin composition according to claims 9 or 10, wherein the flame retardant is melted before it is added to the resin.

12. The method for producing a thermoplastic resin according to claim 1, wherein the volatile components are selected from the group consisting of ethylbenzene, xylene, toluene, styrene, and $C_1$–$C_{10}$ alcohols.

\* \* \* \* \*